US007525695B2

(12) United States Patent
Akaike

(10) Patent No.: US 7,525,695 B2
(45) Date of Patent: Apr. 28, 2009

(54) IMAGE READING APPARATUS

(75) Inventor: Yutaka Akaike, Yamanashi-ken (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 1046 days.

(21) Appl. No.: 10/876,516

(22) Filed: Jun. 28, 2004

(65) Prior Publication Data

US 2004/0263918 A1 Dec. 30, 2004

(30) Foreign Application Priority Data

Jun. 27, 2003 (JP) ............................ 2003-184910

(51) Int. Cl.
*H04N 1/04* (2006.01)
*H04N 1/40* (2006.01)
*H04N 1/46* (2006.01)

(52) U.S. Cl. ....................... 358/471; 358/474; 358/505; 358/497

(58) Field of Classification Search ................. 358/471, 358/474, 505, 497, 482, 483, 496, 498, 513, 358/514; 250/208.1, 239, 234, 235, 236; 400/354, 354.1, 354.2, 354.3
See application file for complete search history.

(56) References Cited

U.S. PATENT DOCUMENTS

| | | | | | |
|---|---|---|---|---|---|
| 4,486,786 | A | * | 12/1984 | Sato et al. | 358/497 |
| 4,965,638 | A | * | 10/1990 | Hediger | 358/497 |
| 5,692,842 | A | * | 12/1997 | Sasai et al. | 400/354 |
| 5,781,313 | A | * | 7/1998 | Nose et al. | 358/497 |
| 6,108,108 | A | * | 8/2000 | Peng | 358/497 |
| 6,167,232 | A | * | 12/2000 | Jimenez et al. | 358/498 |
| 6,201,619 | B1 | * | 3/2001 | Neale et al. | 358/505 |
| 6,349,155 | B1 | * | 2/2002 | Youda et al. | 382/312 |
| 6,542,279 | B2 | * | 4/2003 | Yi et al. | 250/234 |
| 6,611,364 | B1 | * | 8/2003 | Craig et al. | 358/497 |
| 6,687,027 | B1 | * | 2/2004 | Fang | 358/497 |

FOREIGN PATENT DOCUMENTS

| | | | |
|---|---|---|---|
| JP | 05-116422 | * | 5/1993 |
| JP | 6-83251 | * | 3/1994 |
| JP | 7-160145 | * | 6/1995 |
| JP | 07-160146 | * | 6/1995 |
| JP | 08-023419 | * | 1/1996 |
| JP | 8-95393 | * | 4/1996 |
| JP | 08-163291 | | 6/1996 |
| JP | 8-339151 | * | 12/1996 |
| JP | 10-39681 | * | 2/1998 |
| JP | 10-123915 | * | 5/1998 |
| JP | 2002-226074 | * | 8/2002 |
| JP | 2007-152889 | * | 6/2007 |

* cited by examiner

*Primary Examiner*—Houshang Safaipour
(74) *Attorney, Agent, or Firm*—Manabu Kanesaka

(57) ABSTRACT

An image reading apparatus enables designs of such apparatus without regard to a grounding location for a guide shaft and reduces the number of assembly hours and fastening members to fasten a ground member of a guide shaft to a frame. An apparatus includes a scanning unit for scanning and reading images on originals placed on a platen; a guide shaft supporting and guiding the scanning unit in a sub-scanning direction; a shaft support unit supporting an end of the guide shaft; and a plastic frame housing the scanning unit and guide shaft and formed with the shaft support unit, wherein the guide shaft is grounded via the shaft support unit.

10 Claims, 9 Drawing Sheets

IMAGE READING APPARATUS

BACKGROUND OF THE INVENTION AND RELATED ART STATEMENT

The present invention relates to an image reading apparatus equipped with a scanner unit for optically reading originals placed on a platen, and particularly to suppression technology for electrical noise propagated by electrical cords or signal cords, and electromagnetic noise dispersed into the air (hereinafter referred to as 'interference').

Image reading apparatuses are 'information technology devices such as information processing and electronic office devices' subject to interference control in Japan. Therefore, such image reading apparatus interference levels are required to be controlled to below standardized values. Particularly in recent years, image reading apparatuses have been equipped with CPU and memory integrated circuits (IC) employing high frequency clock signals to read images on originals with high resolution. It is difficult to clear these strict interference standards in Japan or in other countries simply by applying interference measures of the same level as those conventionally applied.

On the one hand, plastic (compound) members are being used more often instead of conventional metal frames made from steel plates having shielding properties, for image reading apparatus frames. This is to reduce the manufacturing costs associated with image reading apparatuses by reducing the number of parts, and to lighten the apparatus weight. The use of plastic members increases the difficulty of suppressing the electromagnetic noise interference (called EMC measures).

FIG. 9 is a view of a conventional image reading apparatus (Japanese Patent Publication No. Hei 8-163291) that moves a scanner unit that optically reads originals placed on a platen 101, in a sub-scanning direction to read the images on the originals. The platen 101 is fastened to the upper portion of a metal frame 102 on the image reading apparatus and an original to be read is placed on the platen 101. A reading unit 103 for optically reading the originals is arranged below the platen 101 and is composed of a light source 103*a*, a line image sensor 103*b* and a lens 103*c*. The reading unit 103 is held by a carriage 104.

The carriage 104 moves reciprocally in the directions of arrows 109 and 110 (the sub-scanning direction) on a guide shaft 108 to read an original placed on the platen 101. The guide shaft 108 holding the carriage 104 is grounded by being integrated with the metal frame 102.

On the other hand, a guide shaft cannot be grounded by a frame in an image reading apparatus in which the guide shaft is fastened to a plastic frame. Therefore, a metal grounding member must be in contact with the guide shaft to enable the guide shaft to be grounded. If the guide shaft is ungrounded, the guide shaft acts as an antenna dispersing electromagnetic noise generated in the electronic circuits on the image reading apparatus. Electromagnetic noise affects the surrounding electronic devices and therefore, it is very important to ground the guide shaft in an image reading apparatus for EMC measures.

However, guide shaft supporting and guiding the reading unit (carriage) in the sub-scanning direction on an image reading apparatus must contact a grounding member in a way that will not interfere with the movement of the scanning unit. In the image reading apparatus disclosed in Tokkai Hei 8-163291, because the carriage 104 is supported on the guide shaft 108 at both ends of the scanning direction, the side surfaces of the carriage come near the frame when the carriage is positioned on a side of the scanning region. For this reason, it is necessary for an image reading apparatus supporting a guide shaft with the frame to ground the guide shaft by touching a metal grounding member to the guide shaft. However, not enough space is available to touch the grounding member and guide shaft.

Thus, it has been necessary to design image reading apparatuses allowing enough space to ground the guide shaft, even if the carriage is positioned on a side of the scanning region. This was performed by setting the supporting position to support the carriage guide shaft toward the inside. Also, when the supporting position of the carriage is determined for the grounding location, apparatus performance, such as the stability of carriage travel, is affected.

Thus, as described above, it has been necessary conventionally to design a grounding position for the guide shaft if the frame is made of plastic. This results in reducing the design freedom of such image reading apparatuses.

Also, when touching a grounding member to the guide shaft to ground it, one end of the grounding member touches the guide shaft, and the other is fastened by screws, etc., to the frame. This configuration simply increases the assembly time and the overall number of parts required.

It is an object of the present invention to increase design freedom of image reading apparatuses by enabling designs without requiring consideration for the grounding position of a grounding member and guide shaft to ground the guide shaft.

It is another object of the present invention to reduce the assembly time and the number of parts by reducing the number of steps to fasten a grounding member to a frame, etc., and fastening members such as screws.

SUMMARY OF THE INVENTION

The present invention provides an image reading apparatus comprising a scanning unit for scanning and reading images on originals placed on a platen; a guide shaft for supporting and guiding the scanning unit in a sub-scanning direction; a shaft support unit for supporting the ends of the guide shaft; and a frame made of plastic housing the scanning unit and guide shaft and formed with the shaft support unit. The guide shaft is grounded via the shaft support unit.

Because the guide shaft support unit itself functions as a ground, it is not necessary to establish a grounding location further inside from the support unit that supports the guide shaft in the image reading apparatus. Furthermore, because the grounding position of the grounding member and the guide shaft need not be considered during design, design freedom is increased.

The shaft support unit comprises a plastic support unit supporting the guide shaft at a predetermined position; and a grounding member touching the ends of the guide shaft to ground the guide shaft.

Also, a second aspect of the present invention in the configuration of the image reading apparatus described above is that the shaft support unit is made of a conductive plastic material so the shaft support unit itself has a grounding function. Through this configuration, the entire area of contact with the guide shaft provides electrical contact, thereby ensuring a secure grounding of the guide shaft. In this case, it is unnecessary to establish a grounding member separate from the shaft support unit, thereby reducing the number of configuring parts and the manufacturing cost.

Still further, the present invention provides an image reading apparatus comprising a scanning unit that scans and reads the images on originals placed on a platen; a guide shaft for supporting and guiding the scanning unit in a sub-scanning direction; a plastic frame housing the scanning unit and the guide shaft; and a wall portion touching each end of the guide shaft and formed with a holding portion for holding the guide shaft. Further comprised are a support unit having a bottom portion arranged with a stage where each end of the guide shaft is placed to position the height direction of the guide shaft. This supports the guide shaft and is formed by the plastic frame. Further included are grounding members for grounding the guide shaft by touching the guide shaft ends.

Grounding by touching the grounding member to an end surface of the guide shaft supported by a holding member of the support unit means there is no need to establish a grounding location further inside from the support unit that supports the guide shaft. This increases the design freedom because a design is possible without having to consider the grounding position of the grounding member and the guide shaft.

The grounding member comprises a contact portion touching an end of the guide shaft. The contact portion is formed with a slit through which the holding unit passes. Through this configuration, the guide shaft is held by the holding unit without being interposed by a contact unit of the grounding member, and is securely fastened without being affected by differences in structure, such as the thickness of the contact portion. This ensures the stable travel of the scanning unit.

Also, the grounding member comprises a regulating unit that fits between the top surface of the bottom portion of the support unit and the bottom surface of the ends of the guide shaft, where the position in the up and down directions is regulated. The regulating unit is formed with a slit through which is passed the stage. This enables the platen surface where originals are placed to be accurately positioned within the depth of focus of the scanning unit.

Also, the present invention provides an image reading apparatus comprising a scanning unit for scanning and reading images on originals placed on a platen; a guide shaft supporting and guiding the scanning unit in a sub-scanning direction; a plastic frame housing the scanning unit and the guide shaft; a support unit formed by the plastic frame and fastened with an end of the guide shaft, for supporting of the guide shaft; and a grounding member for grounding the guide shaft. With this configuration, the ends of the guide shaft on the support shaft make contact with the grounding member.

Simply by fastening the guide shaft to the support unit, the grounding member is also fastened at a predetermined position while in contact with the guide shaft. This eliminates assembly processes to fasten a grounding member and any components required to fasten the grounding member, thereby reducing the number of assembly hours and the number of configuring components. Also, the ends supportingly fastened by the support unit contact the grounding member and are thus grounded. For this reason, there is no need to establish a setting position for the guide shaft further inside from the support unit. This, again, increases the design freedom.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Hereunder, preferred embodiments of the image reading apparatus according to the instant invention shall be described in detail with reference to the accompanying drawings.

Figure 1:
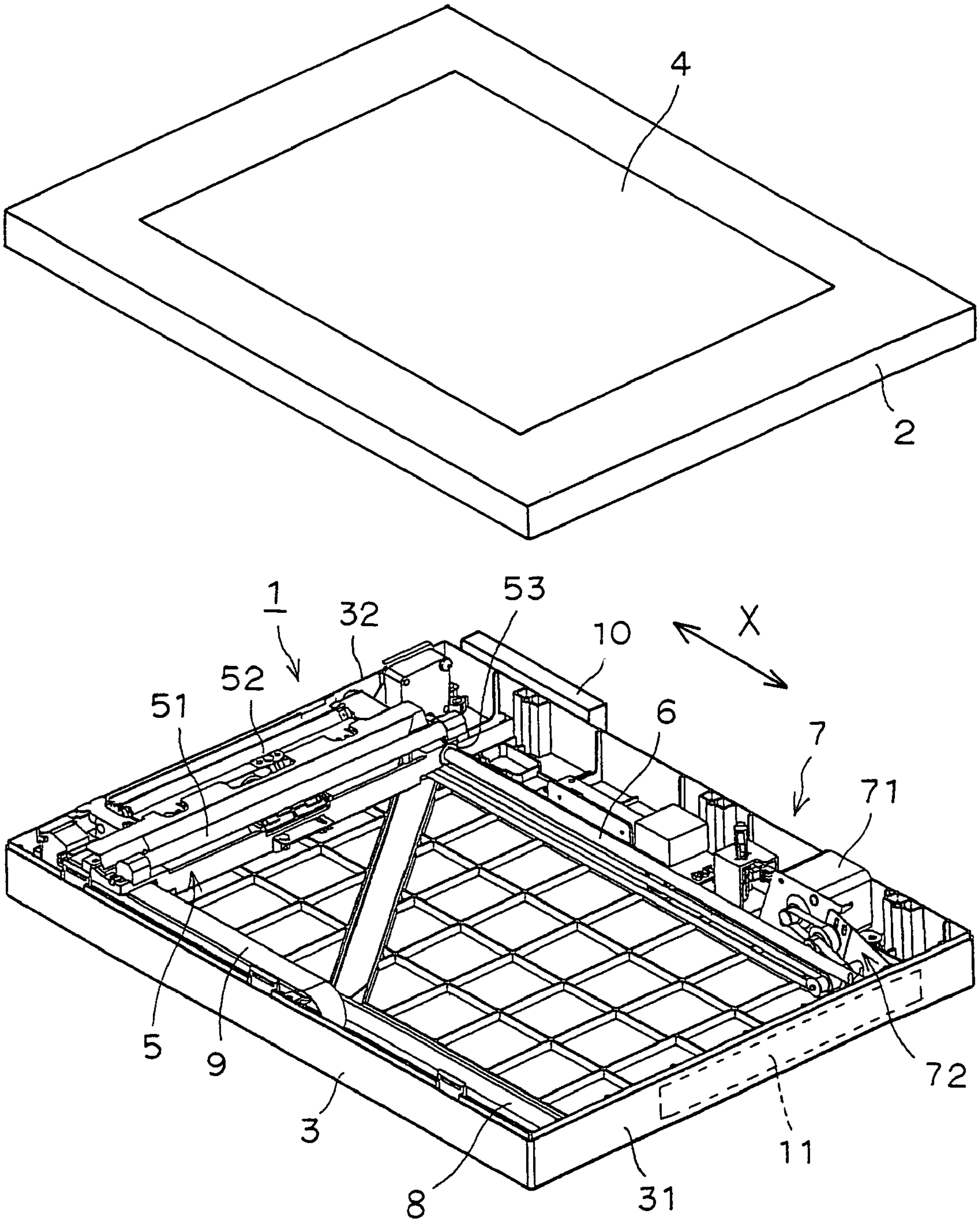
FIG. 1 is a perspective view of the overall configuration of the image reading apparatus according to the present invention.

FIG. 1 is a perspective view of the overall configuration of the image reading apparatus 1. The image reading apparatus 1 is equipped with an upper frame 2 and a lower frame 3. Each of the upper frame 2 and lower frame 3 is formed in plastic. The plastic material used, such as acrylic butadiene-stylene (ABS) and polycarbonate (PC), has high electrical resistance characteristics.

A platen 4 for placing originals is fastened to the upper frame 2 using fastening means (not shown in the drawings), such as screws. A scanning unit 5, attached to bottom frame 3, scans and reads the images on originals placed on the platen 4; a guide shaft 6 supports one end of the scanning unit 5 (one side in the main scanning direction) and guides the scanning unit 5 in the sub-scanning direction (in the direction indicated by the arrow X in FIG. 1); a guide rail 8 supports the other end of the scanning unit 5 (the other end in the main scanning direction) and guides the scanning unit 5 in the sub-scanning direction; drive means 7 moves the scanning unit 5 in the sub-scanning direction; and a metal reinforcement plate 11 (made from a metallic material such as a steel plate or stainless steel) reinforces the strength of the bottom frame 3.

Also, a control substrate 10 is equipped with an image processing unit for processing image signals output from the scanning unit 5 via a CPU. A flexible cable 9 controls the image reading apparatus and is housed in a metallic frame and fastened along the sub-scanning direction of the bottom frame 3.

A scanning unit 5 includes a light source 51 that irradiates light onto originals placed on the platen; a plurality of mirrors 52 for reflecting light from the light source 51; a lens (not shown in the drawings) that collects light reflected from originals; an image sensor (not shown in the drawings) arranged with a plurality of photoelectric conversion elements in a main scanning direction that convert light collected by the lens for reading; and a sensor substrate (not shown in the drawings) equipped with an A/D converter that supports the image sensor and converts analog signals output from the image sensor into digital signals.

Drive means 7, mounted on the bottom frame 3, includes a drive source motor 71 and drive transmission means 72 such as gears or a timing belt for transmitting the drive of the motor 71 to the scanning unit 5. The guide shaft 6 is formed from a bar-shaped metal (for example, metal that has low electrical resistance, such as steel or stainless steel) having a round sectional form. Both ends of guide shaft 6 are supported and fastened by a shaft support unit formed on both a first side plate 31 and a second side plate 32 on the bottom frame 3.

Also, the scanning unit 5 is slide-ably supported on the guide shaft 6 via a sliding member 53. While the drive from the motor 71 moves the scanning unit 5 in the sub-scanning direction, the scanning unit 5 reads the images on an original placed on the platen 4. Image data obtained from the reading scan is transmitted via the flexible cable 9. After the image is processed on the control substrate 10, the image is then output to a data processing device such as an image forming apparatus (a copier) or to a personal computer.

Figure 2:
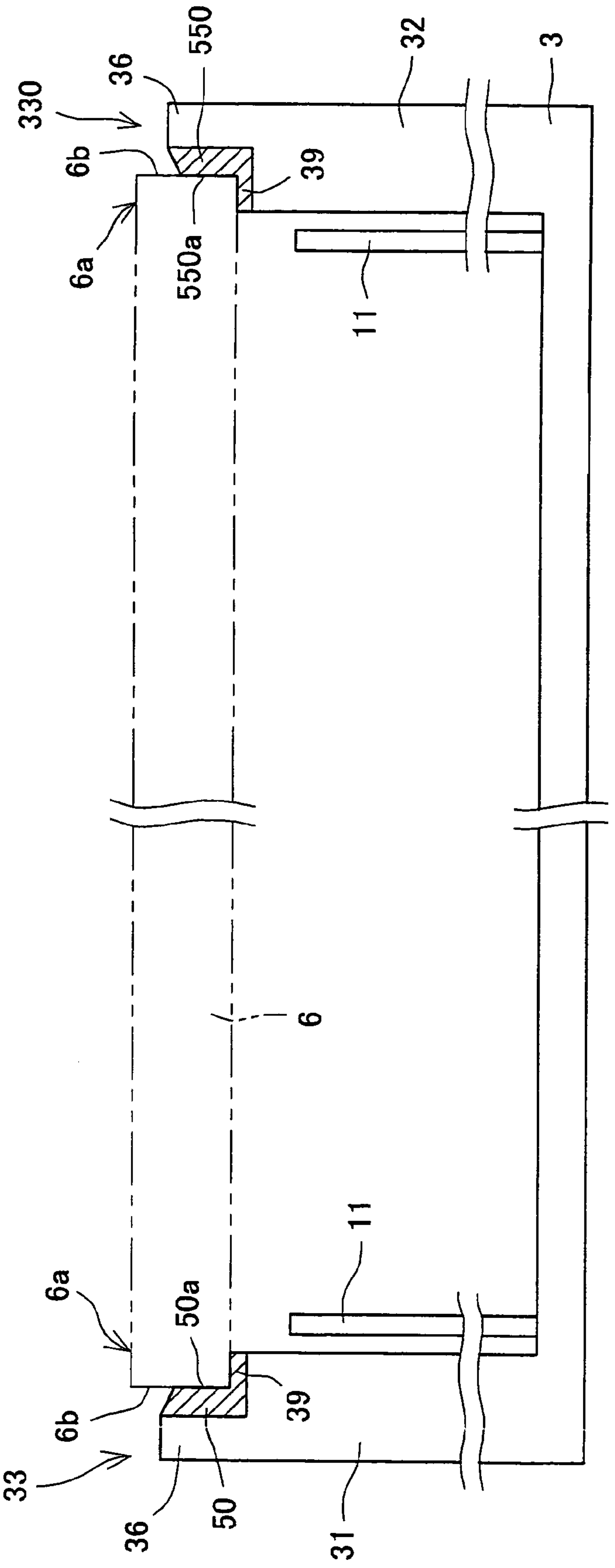
FIG. 2 is a view of the arrangement of the support unit according to the present invention.
Figure 3:
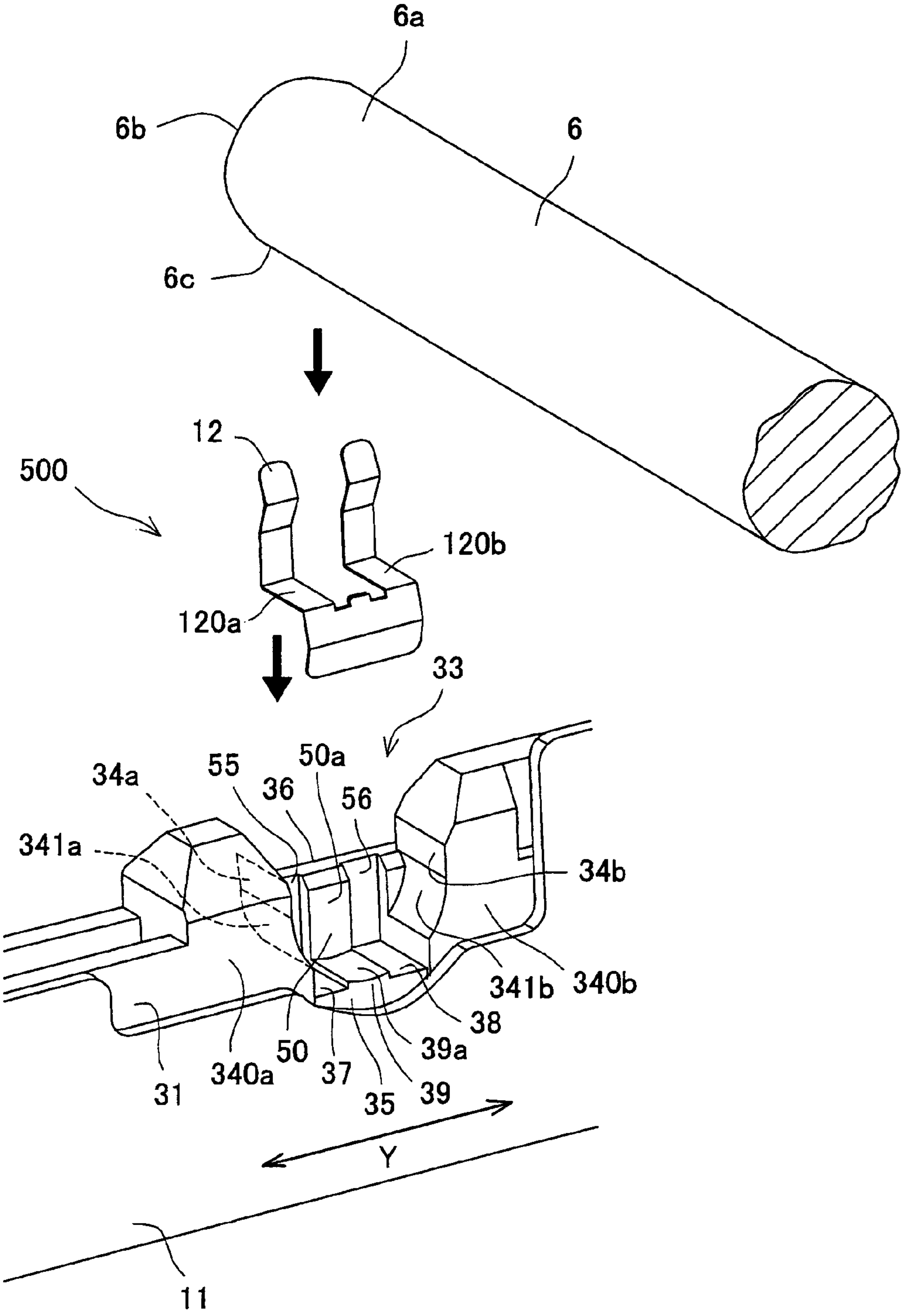
FIG. 3 is a view of a first embodiment of the shaft support unit which is the main configuring portion of the image forming apparatus according to the present invention.

FIG. 3 is a view of a first embodiment of a shaft support unit 500 which is the main configuring portion of the image forming apparatus according to the present invention. According to the first embodiment of the present invention, shaft support unit 500 includes support units 33 (support unit 330 on the opposite end of guide shaft 6 as depicted in FIG. 2 and described below) fastening the guide shaft 6 at a predetermined and fixed position, and a ground member 12 touching and grounding the guide shaft 6.

As depicted in FIG. 2, the support units 33 and 330 support the ends 6*a* and 6*a* of the guide shaft 6 and are unitizingly formed to the bottom frame 3 at opposing positions to the two side plates, i.e., a first side plate 31 and a second side plate 32 mutually parallel to the main scanning direction of the bottom frame 3. FIG. 3 is an expanded perspective view of the support unit 33 formed by the first side plate 31, viewed from above.

As depicted in FIG. 3, the support unit 33 includes a pair of separated side walls 340*a* and 340*b*; the bottom portion formed between the side walls 340*a* and 340*b* supports the bottom surface of the guide shaft 6; and an outer wall 36 (wall portion) touches the end of the guide shaft 6. The upper area of the support unit 33 is open to allow the end 6*a* of the guide shaft 6 to mate with the support unit 33 from above.

Arc-shaped surfaces 341*a* and 341*b* are formed on the inner surface of each side wall 340*a* and 340*b*. The diameters of the arc-shaped surfaces 341*a* and 341*b* allow for the firm mating of the outer surface of the guide shaft 6 and positions the guide shaft 6 at a predetermined position in the main scanning directions indicated by the arrow Y in the drawing.

Level portions 34*a* and 34*b* are formed above each of the arc-shaped surfaces 341*a* and 341*b*. The distance between the level portions 34*a* and 34*b* is slightly shorter than the diameter of the guide shaft 6. Thus, when mating the guide shaft 6 to the support unit 33 from above, the space between the level portions 34*a* and 34*b* elastically widens by pushing the guide shaft 6 downward from above. After inserting the guide shaft 6, the position of the main scanning direction (the direction of the arrow Y in FIG. 3) is determined by the level portions 34*a* and 34*b* because the level portions 34*a* and 34*b* are slightly shorter than the diameter of the guide shaft 6. Thus, the guide shaft 6 is fastened such that it does not come lose and fall. The stage 39, where the end portion 6*a* of the guide shaft 6 is set, is formed on the central area of the bottom portion 35. The upper surface 39*a* of the stage 39 that touches the bottom surface 6*c* of the end portion 6*a* of the guide shaft 6 is approximately 0.6 mm higher than top surfaces 37 and 38 of the bottom portion 35 on both sides of the stage 39. The upper surface 39*a* of stage 39 is arc-shaped. The guide shaft 6 is positioned at a predetermined height when a bottom surface 6*c* of the guide shaft 6 touches the upper surface 39*a* of the stage 39. Furthermore, the length in the main scanning direction (the arrow Y in FIG. 3) of stage 39 is shorter than the guide shaft 6 diameter.

A contact portion 50 (holding portion) touches an end 6*b* of the guide shaft 6 and is formed in the center of the outer wall 36. In one embodiment, surface 50*a* of the contact portion 50 is approximately 0.6 mm higher than the two surfaces 55 and 56 of the outer wall 36. Also, as is clearly depicted in FIG. 2, a contact portion 550 (holding portion) is formed in the same manner as contact portion 50, but on the support unit 330 on the second side plate 32. The distance between the two contact portions 50 and 550 is such that the guide shaft 6 mates therein. With the contact of the surfaces 50*a* and 550*a* of contact portions 50 and 550, respectively, and the center portion of both ends 6*b* and 6*b* of the guide shaft 6, the guide shaft 6 is held between the contact portions 50 and 550.

Figure 4:
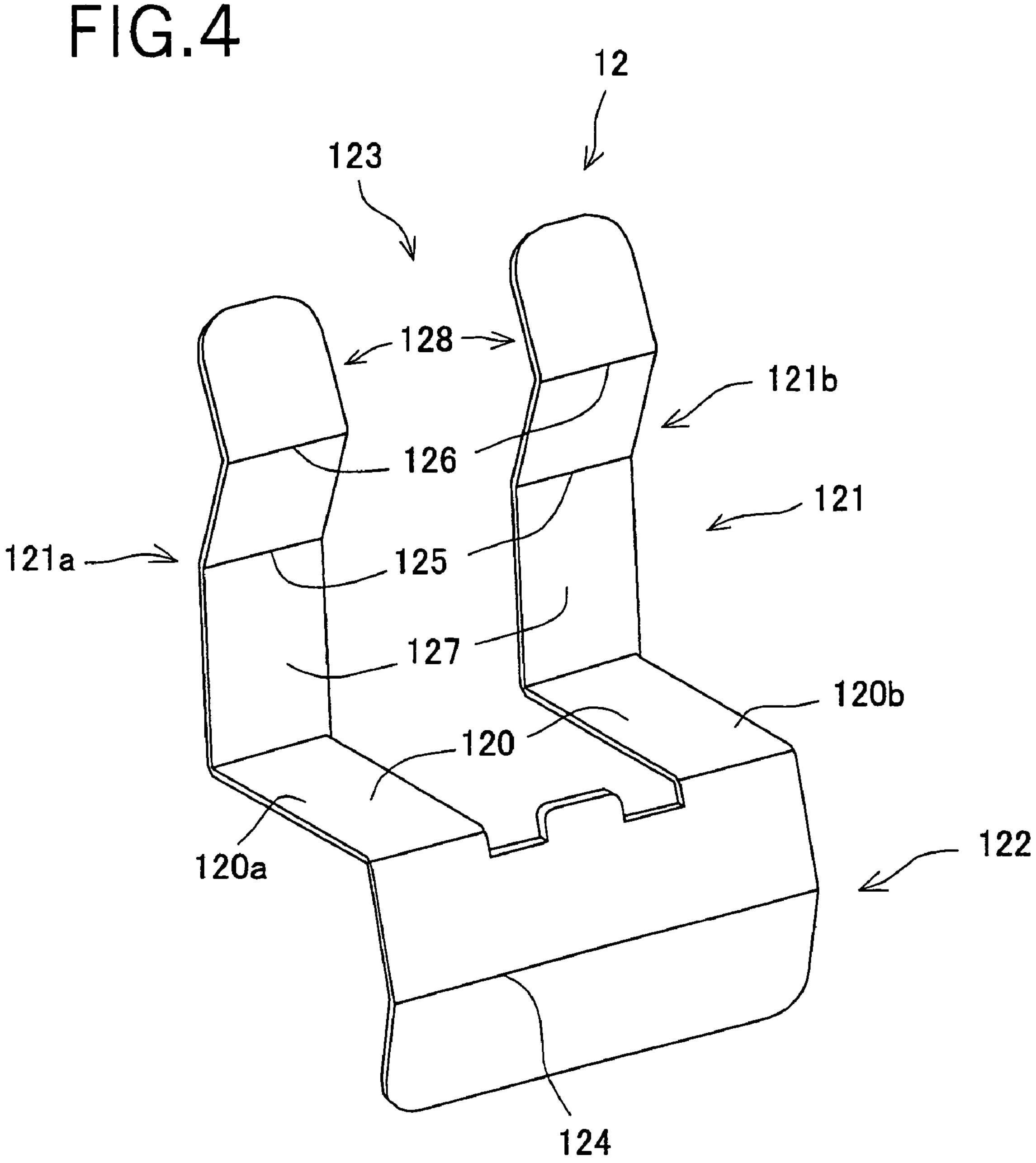
FIG. 4 is a view of the grounding member according to the first embodiment of the present invention.

Next, FIG. 4 is a view of one example of the grounding member which makes up the shaft support unit according to the first embodiment of the present invention.

As is shown in FIG. 4, the grounding member 12 is comprised of an elastic, metallic member, e.g., a metal plate spring with a low electrical resistance, such as that found in copper plates or steel plates. The unitary grounding member 12 includes a level portion 120 which is the regulating unit described below. A contact portion (electrical contact portion) 121 rises from the level portion 120 and a lower portion 122 extends downward from the level portion 120. A bend, i.e., first bent portion 124, is formed in the lower portion 122 by a bending process.

Another bend, i.e., second bent portion 125, is formed in the contact portion 121. Downward of the second bent portion 125 is a lower contact portion 127, and upward is an upper contact portion 128. Another bent portion, i.e., third bent portion 126, is formed in the upper contact portion 128.

The lower contact portion 127 is formed substantially vertical with respect to the level portion 120. The upper contact portion 128 is bent away from the third bent portion 126.

A slit 123 is formed at the center of level portion 120 and contact portion 121 and separates the level portion 120 and the contact portion 121 into two. sections. The level portion 120 is made up of a first level portion 120*a* and a second level portion 120*b*. The contact portion 121 includes the contact portion 121*a* and the contact portion 121*b*.

Obviously, the shape of the grounding member 12 is not limited to the structure depicted in FIG. 3 and a variety of other shapes are possible.

The mounting of the grounding member 12 and the guide shaft 6 is performed by first setting the grounding member 12 on the support unit 33, then fastening the end of the guide shaft 6 from above into the support unit 33.

Figure 5:
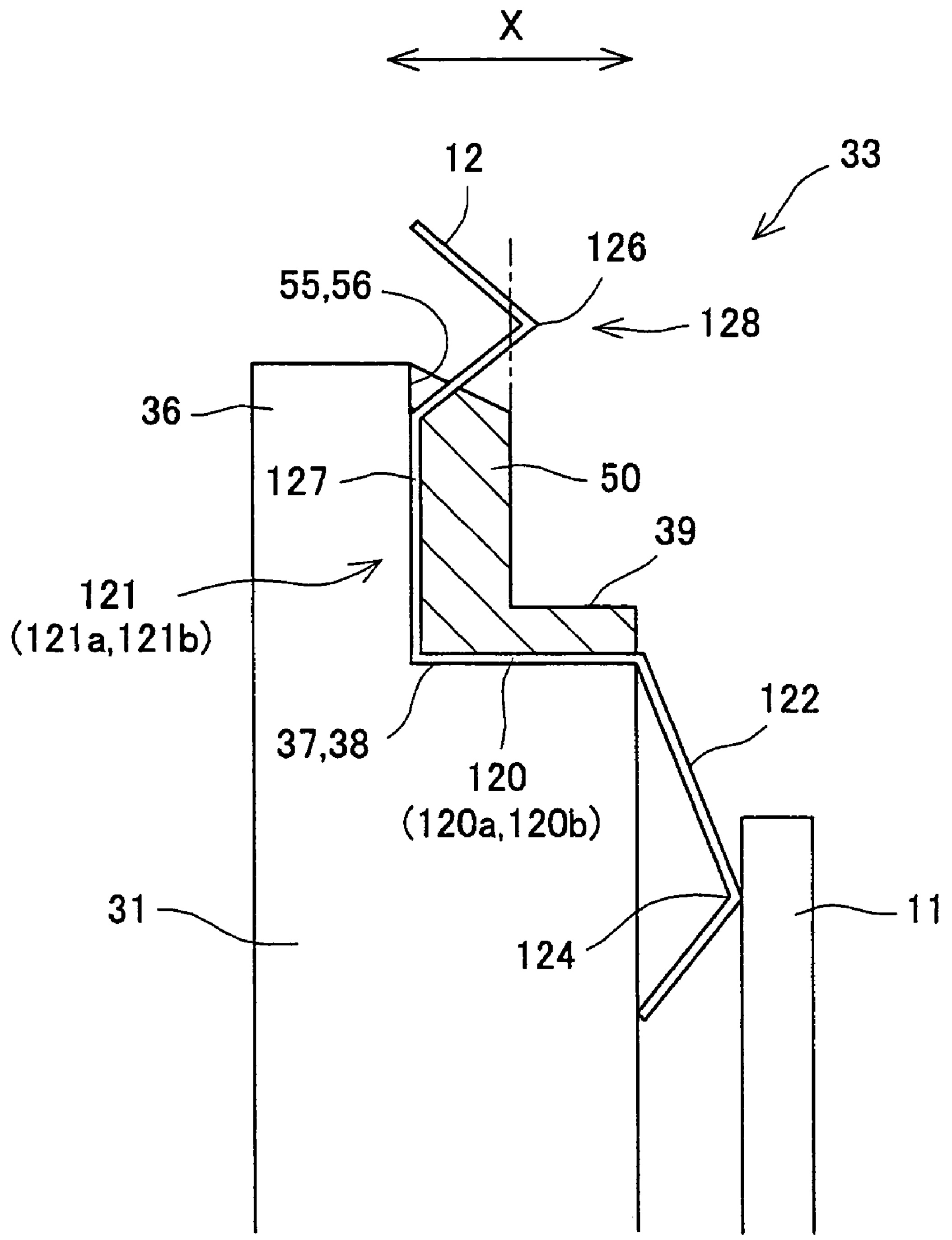
FIG. 5 is a view depicting the placement of the grounding member on the support unit according to the first embodiment of the present invention.

A description of mounting grounding member 12 on the support unit 33 using FIG. 3 and FIG. 5 is now provided.

As shown in FIGS. 3 and 5, the first level portion 120*a* and the second level portion 120*b* of the grounding member 12 touch the bottom portion of upper surfaces 37 and 38 to set the grounding member 12 on the support unit 33. In one embodiment, the surface height of the contact portion 50 and the stage 39 are approximately 0.6 mm, and the thickness of the grounding member 12 is approximately 0.2 mm so the contact portion 50 and the stage 39 protrude through the slit. Specifically, the contact portion 50, which is the holding unit, passes through the contact portion 121 via the slit 123. The stage 39 passes through the level portion 120, which is the regulating portion, via the slit 123.

Also, with the grounding member 12 mounted on the support unit 33, the third bent portion 126 of the grounding member 12 protrudes inward from the contact member 50. Because the grounding member 12 is composed of a plate spring, the third bent portion 126 is elastically deformable at the upper contact portion in the shaft direction (sub-scanning direction) of the guide shaft 6 indicated by the arrow X in FIG. 5.

The lower contact portion 127 touches the outer wall surfaces 55 and 56 on the support unit 33.

Further, the lower portion 122 of the grounding member 12 is inserted between the first side plate 31 and the reinforcement plate 11. The first bent portion 124 touches the reinforcement plate 11, which is a ground, in order to ground grounding member 12.

Figure 6:
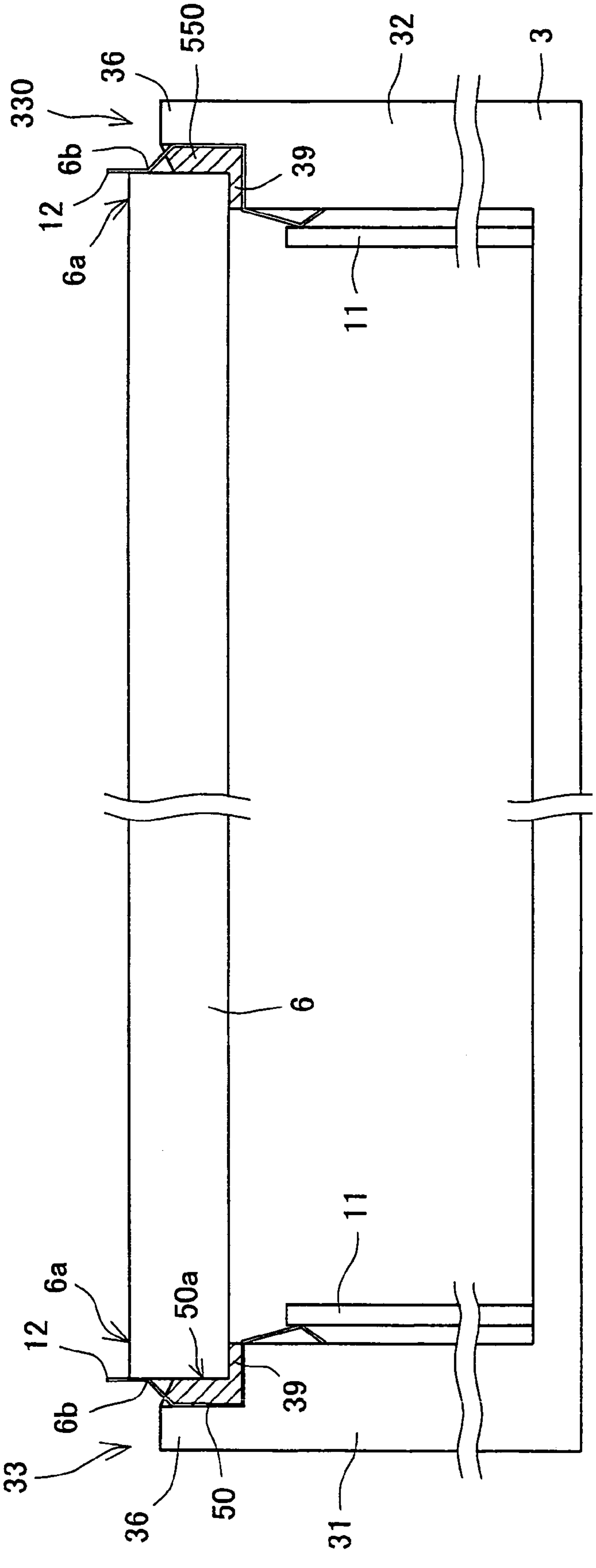
FIG. 6 is a view depicting the guide shaft being supported by the support unit according to the first embodiment of the present invention.
Figure 7:
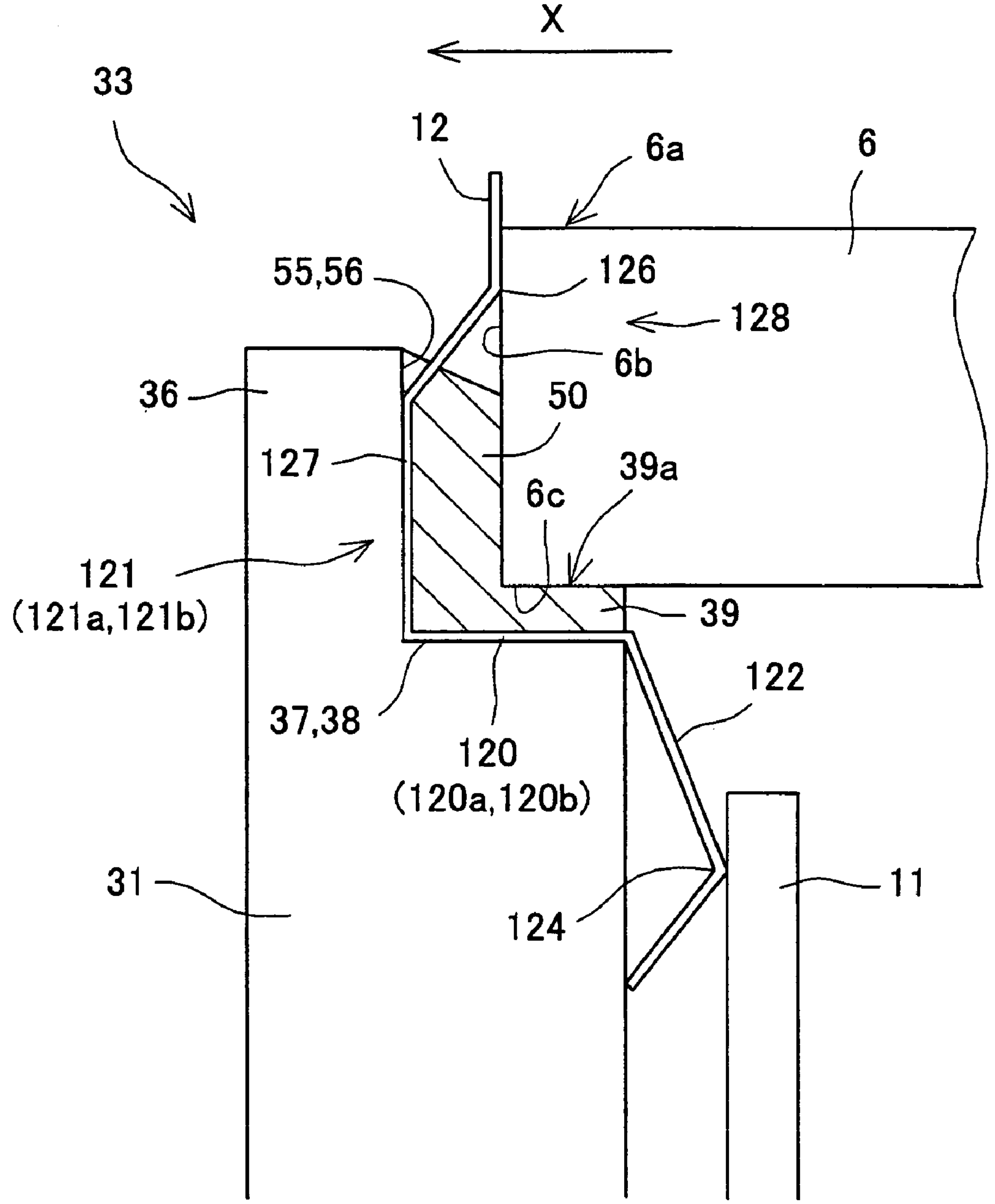
FIG. 7 is an expanded sectional view of the support unit when the guide shaft is being supported by the support unit according to the first embodiment of the present invention.

Next, FIG. 6 depicts each end of the guide shaft 6 fastened to the support unit 33. FIG. 7 is an expanded sectional view of the support unit 33 depicted in FIG. 6.

When the end portion 6*a* of the guide shaft 6 is inserted between the side walls 340*a* and 340*b*, the end portion 6*a* mates with the arc-shaped surfaces 34*a* and 34*b* where guide shaft 6 is fastened and supported. As depicted in FIGS. 6 and 7, the third bent portion 126 is pressed against the outer wall 36 side by the end 6*b* of the guide shaft 6. The contact portion 121 is sandwiched between the guide shaft end surface 6*b* and the surfaces 55 and 56 on the outer wall 36 thereby fastening the grounding member 12 on the support unit 33. At this time, the third bent portion 126 (and the upper contact portion 128 that is higher than the third bent portion) is in contact with the guide shaft end surface 6*b*. Because the first bent portion 124 of the lower portion 122 is touching the metal reinforcement member 11, the guide shaft 6 is grounded via the grounding member 12 and the metal reinforcement member 11.

In this manner, by fastening the guide shaft 6 to the support. unit 33, the grounding member 12 is also fastened while in contact with the end surface 6*a* of the guide shaft 6. Therefore, no work is required to fasten a grounding member so assembly time is reduced, and the number of parts, such as screws used to fasten such parts, is also reduced. Also, because the guide shaft 6 is grounded with the grounding member 12 at the end surface 6*a* supported by the support unit 33, there is no need to establish a grounding position for the guide shaft 6 further inside from the support unit 33, thereby increasing design freedom.

The level portion 120 (the regulating portion, the first level portion 120*a* and the second level portion 120*b*) of the grounding member 12 is sandwiched between the bottom portion of upper surfaces 37 and 38 of the support unit 33 and the end portion bottom surfaces 6*c* of the guide shaft 6. The position in the upward and downward directions, i.e., the vertical direction, is thus regulated, so the guide shaft 6 will not fall even if subjected to vibrations.

Also, the upward and downward directions are positioned by directly contacting the lower surface 6*c* of the guide shaft 6 to the upper surface 39*a* of the stage 39 via the grounding member 12. For this reason, scanning unit 5, supported by the guide shaft 6, is positioned at a predetermined height that is a constant distance from the original reading surface (the platen surface) to the lens, in view of the depth of focus. However, by reducing the cumulative tolerance using the stage upper surface 39*a* of the support unit 33, the upward and downward positioning of the guide shaft 6 accurately positions the reading unit at a predetermined height, without being affected by the thickness differences of the grounding member 12 or flatness thereof.

Further, the guide shaft 6 is held between the contact portions (holding unit) 50 and 550, as depicted in FIG. 6. The central portion of both end surfaces 6*b* of the guide shaft 6 are fastened in direct contact with the contact portion surfaces 50*a* and 550*a* without being interposed by the grounding member 12. Because the guide shaft 6 is fastened without being affected by the thickness of the grounding member 12 or its flatness, the amount of mis-positioning of the sub-scanning direction of the guide shaft 6 is reduced. Also, scanning vibration caused by the scanning unit 5 is reduced, thereby achieving a more stable travel for the scanning unit 5.

When the end of the guide shaft 6 is inserted from above with the grounding member 12 mounted on the support unit 33, the third bent portion 126 of the grounding member 12 touches the end of the guide shaft 6. Therefore, the guide shaft 6 touches the contact portion 121 of the grounding member 12 at the support unit 33 and is thus grounded by the reinforcement plate 11.

The end portions (end surfaces) of the guide shaft 6, which is supported by a support unit unaffected by the scanning of the scanning unit 5, is in contact with a grounding member 12. Therefore, the scanning unit 5 can be designed without concern for a contact position of the grounding member 12 and the guide shaft 6 and thereby increases design freedom.

Also, because it is possible to fasten the grounding member 12 in contact with the guide shaft 6 at the same time that the guide shaft is fastened to the support unit 33, the number of assembly hours and the number of parts are reduced.

According to another embodiment of the present invention, the end surfaces 6*b* of the guide shaft 6 and plate spring are in contact and grounded with the elasticity of the plate spring. Therefore, even if, due to the difference in the thermal expansion coefficient of the plastic frame and the metal guide shaft, there is a change in the distance between the end surfaces of the guide shaft and side plates of the frame caused by a rise in the temperature inside the image reading apparatus, the end surfaces of the guide shaft and plate springs are still in secure contact.

Figure 8:
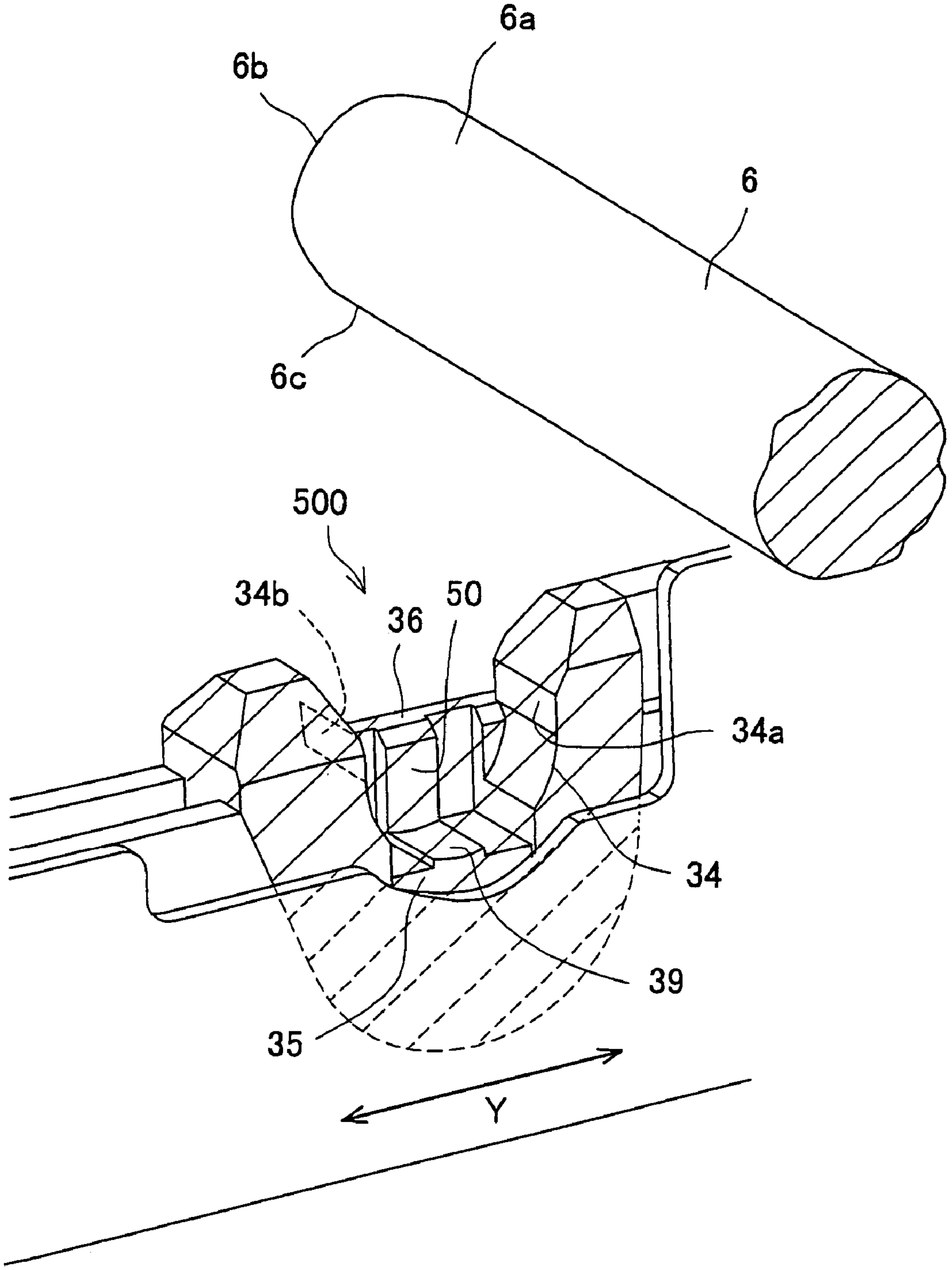
FIG. 8 is a view of a second embodiment of a shaft support unit according to the present invention.
Figure 9:
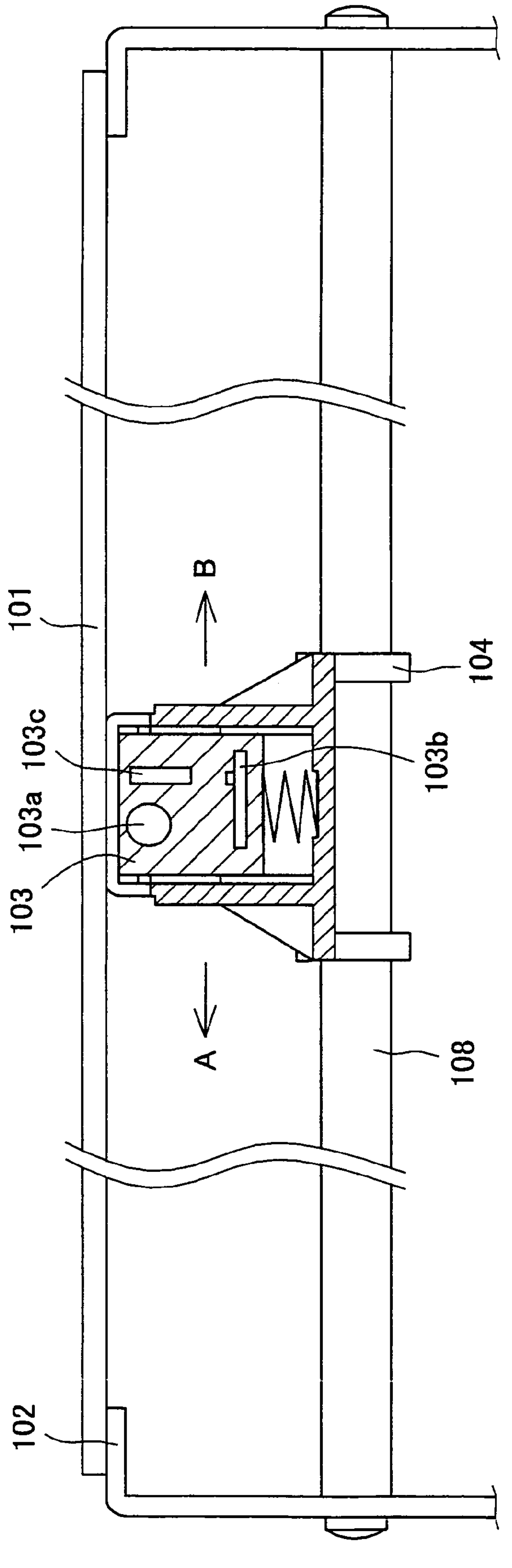
FIG.9 Prior Art
FIG. 9 is a view of an image reading apparatus of the prior art to ground a guide shaft to a metal frame.

FIG. 8 is a view of a second embodiment of the shaft support unit which is the main configuring portion of the image forming apparatus according to the present invention.

In the second embodiment, the shaft support unit 500 is made of a conductive plastic material. A conductive plastic member or conductive rigid rubber material is used for the conductive plastic material. Even if the entire conductive member is conductive, a predetermined thickness portion of the member surface may be conductive. In the second embodiment of the present invention, the shaft support unit 500 of the region, indicated by the shaded region in FIG. 8, provides an additional function (grounding function) as the grounding member of the first embodiment. Therefore, because the guide shaft support unit itself in the second embodiment has a grounding function, it is not necessary to establish a grounding location further inside from the support unit to support the guide shaft in the reading apparatus of the second embodiment. Also, because designing is possible without having to consider the grounding position of the grounding member and the guide shaft, the design freedom increases. The support unit of shaft support unit 500 has the same configuration as the support unit of the first embodiment, thus the description is omitted.

As described in detail above, in an apparatus equipped with a shaft support unit for supporting a guide shaft on a plastic frame, the guide shaft is grounded and contributes to the grounding function of the entire guide shaft which improves the design freedom. Thus, reading apparatus designs may be made without regard to the grounding position of a grounding member and guide shaft.

Further, an image reading apparatus according to the present invention reduces the assembly time and the number of parts because it is possible to fasten the grounding member in contact with the guide shaft at the same time that the guide shaft is fastened to the support unit.

In accordance with the above-described embodiments, an example is provided of a scanning unit that houses an optical system and image sensors. The present invention may also be applied to a mirror moving type apparatus moving two mirror units to scan and read originals. Further, in accordance with the above-described embodiments, both ends of the guide shaft touch the grounding members to be grounded, but is also effective if only one end of the guide shaft is contacted, depending on the level of interference.

Still further, in accordance with the above-described embodiments, the guide shaft ends are configured to mate with the shaft support unit (support unit), but it is also possible to fasten the ends of the guide shaft to the shaft support unit (support unit) using metal screws to both fasten and electrically ground the guide shaft and grounding member by sharing the grounding member with the screws. It will be readily seen by one of ordinary skill in the art that the present invention fulfills all of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The disclosure of Japanese Patent Application No. 2003-184910 filed on Jun. 27, 2003 is incorporated herein.

While the invention has been explained with reference to the specific embodiments of the invention, the explanation is illustrative and the invention is limited only by the appended claims.

What is claimed is:

1. An image reading apparatus comprising:

a scanning unit for scanning an original placed on a platen;

a guide shaft for supporting and guiding said scanning unit in a sub-scanning direction;

a plastic frame housing said scanning unit and said guide shaft;

a shaft support unit for supporting the guide shaft, said shaft support unit being made of plastic and integrally formed with the plastic frame; and a grounding member attached to the shaft support unit and contacting an end of the guide shaft for grounding said guide shaft;

wherein said shaft support unit comprises a plastic first support portion directly contacting the end of the guide shaft and supporting the guide shaft, and a plastic second support portion sandwiching a part of the grounding member with respect to the guide shaft and supporting the grounding member.

2. The image reading apparatus according to claim 1, wherein said grounding member includes a contact portion contacting the end of said guide shaft.

3. The image reading apparatus according to claim 2, wherein said first support portion comprises a holding unit contacting the end of said guide shaft and holding said guide shaft, and said contact portion includes a slit through which said holding unit passes.

4. The image reading apparatus according to claim 1, wherein said grounding member contacts a metallic member reinforcing said frame thereby grounding said guide shaft.

5. The image reading apparatus according to claim 1, wherein said grounding member comprises a regulating unit fit between said second support portion and said guide shaft so that a position thereof in a vertical direction is regulated.

6. The image reading apparatus according to claim 5, wherein said first support portion includes a stage where the end of said guide shaft is placed for positioning the guide shaft in the vertical direction; and said regulating unit includes a slit through which said stage passes.

7. The image reading apparatus according to claim 1, wherein said grounding member is made of an elastic member, and said grounding member is elastically retained between said second support portion and the end of said guide shaft.

8. The image reading apparatus according to claim 1, wherein said first support portion comprises a pair of side walls for holding the guide shaft therebetween, a contact portion contacting the end of the guide shaft, and a stage supporting a bottom of the guide shaft.

9. The image reading apparatus according to claim 8, wherein said second support portion comprises side surfaces sandwiching the contact portion, and upper surfaces of an outer wall sandwiching the stage.

10. An image reading apparatus comprising:

a scanning unit for scanning an original placed on a platen;

a guide shaft for supporting and guiding said scanning unit in a sub-scanning direction;

a shaft support unit for supporting an end of said guide shaft, said shaft support unit comprising a plastic support unit for supporting said guide shaft at a predetermined position, and a grounding member contacting an end of said guide shaft to ground said guide shaft;

a plastic frame formed with said shaft support unit and housing said scanning unit and said guide shaft; and means for grounding said guide shaft via said shaft support unit, said grounding means being attached to the guide shaft, wherein said grounding member comprises a regulating unit fit between a top surface of a lower portion of said support unit and a bottom surface of an end of said guide shaft so that a position thereof in the vertical direction is regulated, a stage is arranged on a bottom portion of said support unit where the end of said guide shaft is placed for positioning the vertical direction of said guide shaft, and said regulating unit includes a slit through which said stage passes.

* * * * *